United States Patent [19]
Melchior et al.

[11] Patent Number: 4,857,252
[45] Date of Patent: Aug. 15, 1989

[54] FIBERBOARD SHIMS CONTAINING BLOCKED ISOCYANATES

[75] Inventors: Wayne R. Melchior, Plymouth; Mieczyslaw Talik, Dearborn Heights, both of Mich.

[73] Assignee: Eagle-Picher Industries, Inc., Cincinnati, Ohio

[21] Appl. No.: 95,161

[22] Filed: Sep. 11, 1987

[51] Int. Cl.$^4$ ............................................. B27N 3/18
[52] U.S. Cl. ..................................... 264/118; 264/109; 264/122; 264/138; 524/14
[58] Field of Search ............... 264/118, 109, 122, 138; 524/14

[56] References Cited

U.S. PATENT DOCUMENTS

| Re. 31,703 | 10/1984 | Prather et al. | ...................... 264/109 |
| 2,790,206 | 4/1957 | Cofek . | |
| 3,440,189 | 4/1969 | Sharp . | |
| 4,029,846 | 6/1977 | Decker et al. | ...................... 428/423 |

*Primary Examiner*—Philip Anderson
*Attorney, Agent, or Firm*—Wood, Herron & Evans

[57] ABSTRACT

Fiberboard shims are manufactured which contain blocked isocyanates. The blocked isocyanates are blended with the other shim components to ensure complete distribution of the isocyanate into the shim, thereby improving the strength characteristics of the shim while simultaneously simplifying the manufacturing procedure. Further, the need for hazardous solvent-based isocyanates in the workplace is eliminated.

6 Claims, No Drawings

FIBERBOARD SHIMS CONTAINING BLOCKED ISOCYANATES

BACKGROUND OF THE INVENTION

This invention is directed to improvements in the manufacture of fiberboard shims for use in the assembly of automobiles.

Shims function by filling gaps between automotive components. The gaps, or spaces, develop as a result of improperly aligned or improperly sized parts, and often cause undesirable audible vibrations in the automobile during operation and occasionally cause mechanical failure.

Such shims produced from steel are known. These shims are produced in a variety of shapes and thicknesses. Steel shims are dimensionally stable as a result of the physical properties of the steel itself. However, shims made from steel are expensive to produce and tend to rattle after being driven into place, resulting in undesirable audible vibrations.

Subsequently, it was found that shims could be produced from cellulosic materials which were hardened by means of a curable impregnated resin. Typically, the raw cellulosic material was processed to form fiberboard of a specific thickness, which was then cut to the desired shape. The cut shims were then impregnated with a hardenable material, such as a phenolic resin. Shims produced in this way were cheaper than steel shims and did not audibly rattle once in position. However, the fiberboard shims tended to deform and delaminate while being tapped into place, and further tended to shrink and absorb moisture during use.

The operational characteristics of fiberboard shims were improved by immersing the fiberboard shims in a solvent-based solution of methylene-bis-(4-phenyl isocyanate) as described in Decker et al U.S. Pat. No. 4,029,846. The named isocyanate, which was critical to the improvement, was believed to react with the terminal ends of the cellulose to produce a chemical- and moisture-resistant shim. Shims made according to the Decker patent resisted compression, exhibited good torque retention, and resisted deformation and delamination while being tapped into place.

Production of fiberboard shims according to the teachings of the Decker '846 patent has certain significant disadvantages. First, the immersion of the shims into the isocyanate solution causes an uneven distribution of isocyanate into the shim body. This limits the thickness of the shim. Further the thicker the shim the weaker it is since only the surface is impregnated. Further the curing temperature causes degradation of the untreated portions.

Also, the immersion step requires additional equipment, additional production time, and special solvents which are considered to be a potential health hazard. Handling isocyanate impregnated material is also quite dangerous.

The Decker patent states that a phenol blocked isocyanate is unsuitable which is accurate relative to the Decker method. Specifically, the required cure temperature degraded the fibers. Further, it was difficult to get the blocked isocyanate into solution.

SUMMARY OF THE INVENTION

It is an object of this invention to permit manufacture of functional fiberboard shims which have an even distribution of isocyanate throughout the shim body. It is a further object of this invention to provide for the addition of an isocyanate without the need for specialized equipment or additional processing time and to provide for improved design freedom. It is yet a further object to permit use of a variety of isocyanates in the manufacture of fiberboard shims.

The present invention is premised on the realization that a fiberboard shim suitable for use in an automotive application can be formed by adding a blocked isocyanate to a fiber slurry, forming a dried fiberboard from the slurry, cutting the board to the desired shape and curing the blocked isocyanate at elevated temperature.

The resulting fiberboard shims have good torque retention and strength due at least in part to the uniform cross-linking of the cellulosic fibers with isocyanate distributed throughout the shim body. Further, the desirable strength characteristics of the shim are attained without the need for a separate dipping operation into a solution containing volatile, potentially hazardous solvents, with attendant savings in costs and time.

DETAILED DESCRIPTION OF THE INVENTION

The invention in its broader aspects is practiced by producing fiberboard shims by mixing a blocked isocyanate with the cellulosic fiber slurry prior to drying, shaping and curing. Specifically, an aqueous slurry of cellulosic fibers is combined with a water soluble thermosetting resin such as phenolic resin, a blocked isocyanate, sizing agent and other optional ingredients to form a furnish. The furnish is formed into a sheet which is dried at a temperature which cures the thermosetting resin and dries the sheet but does not cure the blocked isocyanate. The fiberboard is then cut to form shims which are then heated to a temperature which effectively cures the blocked isocyanate.

The fiberboard shim is formed from primarily cellulosic material, such as is derived from kraft bags and kraft corrugated stock. The bags and corrugated stock are processed by subjecting the material to agitation in the presence of caustic and a large weight excess of water at room temperature or at slightly elevated temperature. The agitation reduces the kraft bags and corrugated stock to fiber, and the caustic aids in wetting and promotes fiberization. A sizing agent is also added during this processing, or refining step. Optionally, a coloring agent may be added at this time.

The refining step is complete when the cellulosic material attains an approximate average finer length within a prescribed range as delineated in Canadian Standard Fineness units. At this point, the refined pulp stock with additives is blended with a water soluble thermosetting resin, preferably a phenolic resin, aluminum potassium sulfate (alum), and blocked isocyanate in a blend chest. The resin serves as a binder for the cellulosic fibers to improve media strength, and the alum alters the slurry pH to form a more acidic mixture which reduces the solubility of the phenolic resin in water and thereby improves the assimilation of the resin into the cellulosic fiber. The blocked isocyanate is preferably added at the blend chest, but may also be added during the refining step.

The blended slurry, which is typically less that 5% solids, is then processed through a paper machine which removes a portion of the slurry water and produces a non-uniform pulp sheet which has approximately 25% to 40% solid material. The non-uniform pulp sheet is pressed and then dried at a temperature effective to cure the thermosetting resin (generally in the range of about 121° to about 138° C.). This drying range is high enough to effectively remove excess water but not so high as to effect a cure of the isocyanate component.

The dried sheet, containing between about 95% to 98% solids, is then processed through a colander and is ciphered to obtain the desired uniform thickness. The uniform sheet can then be trimmed to form a roll of uniform width, which is then sent to the customer for cutting to form uncured shims. The cutting operation is typically effected by the use of dies.

After die cutting, the shims are then cured in an oven at approximately 205° C. for a short period of time, typically about 10 minutes. Curing under these conditions minimizes degradation of the cellulosic fiber. Curing at this temperature breaks the bond between the blocking group on the isocyanate and the isocyanate itself, with the result that reactive sites on the isocyanate become available to bind to the cellulosic fibers in the shim. The curing step thereby promotes crosslinking of the cellulosic fibers and improves the shim's resistance to deformation and delamination.

The blocked isocyanate is formed by reacting isocyanate with a compound, such as phenol, which later releases from the isocyanate upon the application of heat, permitting the isocyanate to react with other groups. In the invention, a blocked isocyanate is chosen which will not release the "blocking" group at the temperature needed to process the shim material through the drying step. The blocking group will release, however, at the curing temperature, permitting the isocyanate to react with the hydroxyl groups of the cellulosic fibers. The reaction of isocyanate with the hydroxyl groups of the cellulosic fibers tends to cross-link the fibers and thereby increase resistance to deformation and delamination.

A large number of blocked isocyanates may be employed according to the teachings of this invention. Because the blocked isocyanates do not have to penetrate a solid body of shim material to be effective as in the solvent-base addition method, the blocked isocyanate is not limited to specific chain length ranges. The compounds in the following non-comprehensive list are included under the description of blocked isocyanates appropriate for use according to the teachings of this invention: phenol blocked 4, 4-diphenylmethane diisocyanate, phenol blocked polymethylenepolyphenylene isocyanate, phenol blocked 2, 4-toluene diisocyanate adduct of trimethylol propane, and phenol blocked 2, 4-toluene diisocyanate trimer.

These blocked isocyanates generally have a cure temperature of from about 160° to about 200° C.

In the present invention, suitable water dispersible or soluble thermoset resins include phenolic or phenol formaldehyde resins, urea or urea formaldehyde resins and melamine or melamine formaldehyde resins. Water soluble refers to the solubility of these resins prior to cure. They should not be water soluble after cure. For purposes of this invention solubility is broadly defined to include resins dispersible within an aqueous solution.

These resins must have a cure temperature lower than the cure temperature of the blocked isocyanate since they provide strength to the fiberboard after it is formed and while it is being cut to the desired shape.

The following detailed examples illustrate the practice of the invention in its most preferred form, thereby enabling a person of ordinary skill in the art to practice the invention. The principles of this invention, its operating parameters and other obvious modifications thereof will be understood in view of the following detailed procedures.

EXAMPLE I

A pulp mixture is refined by combining in a standard pulper unit 28.0 lbs kraft bags, 12.0 lbs kraft corrugated stock, 0.5 lb Pexol 243 rosin sizing agent, sufficient caustic to produce a solution pH of 7.0 to 7.5, and water to form a solution having approximately 4% solids. Also, 3.0 g methyl violet and 1.0 g methyl blue dyes are added. The mixture is agitated at room temperature with further addition of water to produce a refined stock having approximately 2% solids and a Canadian Standard Freeness (CSF) value of 240. The Canadian Standard Freeness value is an approximate measure of cellulose fiber length.

About 40.5 lbs of refined stock is then combined in a blend chest with 13.8 lb of a 42% active aqueous solution of Reichold 22-398 phenolic resin with agitation. The mixture pH at this point is approximately 10.2 and is reduced to 7.2 by the addition of a solution of approximately 25% to 50% aluminum potassium sulfate (alum).

After further agitation to ensure homogeneity, 1.9 lb of powdered Mobay Mondur S blocked isocyanate is slurried in water to form a 50% solids mixture, added to the stock mixture and agitated. A final addition of alum solution reduces the pH to 5.2.

The finished pulp is then processed through a paper machine which causes an increase in the solids content of the pulp mixture to about 32.8%. The concentrated pulp mixture is pressed and then dried at between 121° and 138° C. to form a sheet having a solids content between 95% and 98%. The sheet is then calendered and calipered to obtain the desired sheet thickness.

The final sheet is trimmed to a standard size and shims are die-cut therefrom. The cut shims are then heated in an oven at about 205° C. for 10 minutes to cure the isocyanate.

EXAMPLE II 28.0 lbs of kraft bags, 12.0 lbs of kraft corrugated stock, 0.5 lb Pexol 243 rosin sizing agent, caustic solution to bring the mixture pH to 7.3, and water sufficient to produce a mixture having about 5% solids are combined at room temperature into a standard pulper unit and agitated. In addition, 3.0 g methyl violet and 1.0 g methyl blue dyes are added.

The components are agitated and additional water is added, decreasing the solids content of the mixture to 1.40%. The refined stock has a Canadian Standard Freeness (CSF) value of 164.

After refining, 40.5 lbs of the stock is mixed with 13.9 lbs of a 42% active aqueous solution of Reichold 22-398 phenolic resin. After agitation, an aluminum potassium sulfate (alum) solution of approximately 25% to 50% solids is added which is sufficient to decrease the pH from 10.2 to 7.2. Then, 2.4 lbs powdered phenol blocked Mobay Mondur M isocyanate is slurried in water to form a solution having approximately 50% solids and is then added while agitating the pulp mixture. After the isocyanate has become uniformly distributed throughout the pulp mixture, additional alum solution is added to reduce the pH to 5.1.

The finished pulp blend is then processed through the paper machine, pressed into sheets, dried, calendered and calipered, formed into uniform size sheets, die cut and cured.

EXAMPLE III

A refined stock is prepared by agitating in a standard pulper unit 28.0 lbs kraft bags, 12.0 lbs kraft corrugated stock, 0.5 lb Pexol 243 rosin sizing agent, caustic solution sufficient to produce a pH of 7.6, and water sufficient to produce a mixture having a solids content of 3%. 3.0 g methyl violet and 1.0 g methyl blue dyes are added to color the shim material.

Approximately 40.5 lbs of the refined stock, having a CSF value of 150, is combined and agitated in a blend chest with 14.5 lbs of a 42% solution of Reichold 22-398 phenolic resin. The pH of the system is then decreased from 10.2 to 6.8 by addition of a sufficient amount of alum solution. Then, 4.0 lbs powdered Mobay Mondur S isocyanate is added to the blend chest and dispersed through the pulp mixture. Additional alum solution is then added to decrease the pH to 5.2.

The finished pulp mixture is then processed in a manner identical to that employed in Examples I and II to produce shaped fiberboard shims.

EXAMPLE IV

For the purpose of demonstrating the advantage of incorporating a blocked isocyanate into the pulp mixture, the following procedure is included for preparing a fiberboard shim which contains no isocyanate.

A refined stock is prepared by combining in a standard pulper unit 28.0 lbs kraft bags, 12.0 lbs kraft corrugated stock, 0.6 lb Pexol 243 rosin sizing agent, caustic solution to adjust the pH to 7.2, and water sufficient to produce a pulp solution having 3.0% solids. Coloration is provided by incorporation of 3.0 g methyl violet and 1.0 g methyl blue dyes. The components are agitated until the stock records a Canadian Standard Freeness value of 152. Additional water is added during refining to decrease the solids content to 2.0%.

40.6 lbs of this refined stock is combined and agitated with 13 lbs of a 42% aqueous solution Reichold 22-398 phenolic resin. The pH of the pulp solution is then decreased to 5.3 with addition of an aluminum potassium sulfate solution having a solids content in the range of about 25% to about 50%.

After thorough agitation, the finished pulp mixture without added isocyanate is processed on a paper machine, pressed, dried, calendered and calipered, formed into uniform sheets, die cut and cured.

EXAMPLE V (COMPARATIVE)

For additional comparison, a fiberboard shim is prepared as in the previous example but wherein the isocyanate is supplied by immersing the cut, dried shim in a solution of the isocyanate in a solvent.

The shim is cut to the required dimensions and immersed in a mixture of 40% by weight Hylene M methylene bis 4-phenyl isocyanate and 60% by weight 2-butanone. The shim is impregnated for 10 minutes and allowed to drip dry for 10 minutes. The shim is cured for 10 minutes at 200° C.

To demonstrate the improvement in properties of fiberboard shims containing blocked isocyanates incorporated into the pulp prior to curing, a table is provided below which compares the results of tests conducted on shims prepared according to the procedures in the five examples listed above.

TABLE A
Comparative Test Data

| Test | I | II | III | IV | V |
|---|---|---|---|---|---|
| Before Curing (Suggested Limit) | | | | | |
| Density (lb/ft$^3$) (62 min) | 77.3 | 60.5 | 68.2 | 64.3 | 69.5 |
| Tensile Strength (PSI) (5200 min) | 6838 | 6998 | 6880 | 5502 | 5733 |
| % Compression (17 max) | 9.8 | 16.8 | 12.4 | 17.9 | 14.4 |
| % Recovery (65 min) | 73.4 | 68.4 | 82.4 | 66.3 | 78.1 |
| Water Absorption | | | | | |
| % Weight Change (35 max) | 37.6 | 31.4 | 28.5 | 31.1 | 42.7 |
| % Thickness Change (35 max) | 42.4 | 31.2 | 31.8 | 36.6 | 45.4 |
| Thickness (inches) | .1137 | .1329 | .1216 | — | .109 |
| % Moisture | 8.5 | 4.7 | 4.4 | — | 7.2 |
| After Curing | | | | | |
| Tensile Strength (PSI) (6400 min) | 9717 | 6965 | 7050 | 5152 | 3522 |
| % Compression (15 max) | 8.10 | 14.9 | 12.4 | 12.0 | 10.3 |
| % Recovery (80 min) | 82.7 | 80.5 | 68.5 | 84.6 | 84.2 |
| Water Absorption* | | | | | |
| % Weight Change (25 max) | 20.7 | 22.9 | 18.6 | 27.8 | 19.7 |
| % Thickness Change (25 max) | 17.6 | 17.9 | 14.2 | 29.7 | 14.8 |

*Immersion for 22 hours at room temperature

In an alternative embodiment of this invention, the blocked isocyanate is added to the pulp slurry during the refining step instead of in the blend chest.

EXAMPLE VI

A pulp mixture is refined by combining in a standard pulper unit 28.0 lbs of kraft bags, 12 lbs of corrugated kraft stock, 0.6 lb Pexol 243 rosin sizing agent, 2.4 lb powdered Mobay Mondur SH blocked isocyanate, sufficient caustic to produce a solution pH in the range of 7.0 to 7.5, and water to form a solution having approximately 3% solids. Coloration is provided through the addition of 3.0 g methyl violet and 1.0 g methyl blue dyes. The mixture is refined to an endpoint of 147 CSF. More water is added during refining to decrease the solids content to 2.0%.

About 40.3 lbs of the refined stock is then combined in a blend chest with 13.0 lb of a 42% active solution of Reichold 22-398 phenolic resin in water. To the blend chest is then added sufficient aluminum potassium sulfate (alum) as a 25% to 50% active solution to produce a pH of 5.3.

The homogeneous mixture is then processed through a paper machine which removes some of the slurry water to increase the solids content of the pulp. The concentrated pulp mixture is pressed and then dried at between 138° to 149° C. to form a sheet having a solids content of between 94% and 97%. The desired thickness is then obtained by calendering and calipering.

The final sheet is trimmed to a standard size and shims are die-cut therefrom. The cut shims are then heated in an oven at about 205° C. for 10 minutes to cure the isocyanate.

EXAMPLE VII

The procedure and reactants used in Example VI are followed here except that the Mondur SH isocyanate from VI is replaced by the same weight of phenol-blocked DuPont HLR-4346 isocyanate. The stock is refined to an endpoint of 158 CSF.

After agitation in the blend chest, the pulp is processed as in Example VI and cured.

EXAMPLE VIII

A pulp mixture is refined by combining in a standard pulper unit 28.0 lbs of kraft bags, 12.0 lbs of kraft corrugated stock, 0.5 lb Pexol 243 rosin sizing agent, 4.0 lbs powdered DuPont Hylene MP blocked isocyanate, sufficient caustic to produce a solution pH of 7.0 to 7.5, and water to produce a solution having approximately 4% solids. Coloration is provided by the addition of 3.0 g methyl violet and 1.0 g methyl blue dyes. The mixture is refined to an endpoint within a range of 140 to 160 CSF.

About 44.5 lbs of refined stock is combined in a blend chest with 14.5 lbs of an aqueous 42% active solution of Georgia-Pacific 2590 phenolic resin. After the resin has been added and agitated, alum is added in the form of a 25% to 50% solution to reduce the pH to within a range of 5.1 to 5.5.

The homogeneous pulp slurry is then further processed as described in earlier examples to form the cured shims.

EXAMPLE IX

The procedure and reactants used in Example VIII are followed here except that the Georgia Pacific phenolic resin is replaced with an equal amount of Reichold 27-398 phenolic resin.

EXAMPLE X

A refined stock is prepared in a standard pulper unit by combining 28.0 lbs kraft bags, 12.0 lbs kraft corrugated stock, 0.5 lb Pexol 243 rosin sizing agent, 4.0 lbs powdered phenol blocked Mobay Mondur M isocyanate, sufficient caustic to produce a solution pH of 7.2, and water to form a solution having 4.1% solids. 3.0 g methyl violet and 1.0 g methyl blue dyes are added to provide coloration. Refining is terminated at the point when the CSF value is 170. Additional water is pumped into the slurry during refining to decrease the solids content to 1.5%.

About 44.5 lbs of refined stock is combined in a blend chest with 14.5 lbs of an aqueous 42% active solution of Reichold 22-398 phenolic resin. After agitation, a 25% to 50% solution of alum is added to adjust the pH to about 5.5.

The pulp mixture is then processed as in earlier runs to produce a cured shim.

The shims containing blocked isocyanates added during refining exhibit improved post-cure tensile strength over shims containing no isocyanate and isocyanate provided via immersion. The following table compares pertinent test data from Examples VI through X and incorporates the data from Example IV as a reference.

TABLE B

| | Comparative Test Data | | | | | |
|---|---|---|---|---|---|---|
| | Example | | | | | |
| Test | IV | VI | VII | VIII | IX | X |
| Before Curing | | | | | | |
| Density (lb/ft$^3$) | 64.3 | 67.7 | 65.5 | 72.7 | 68.9 | 64.4 |
| Tensile Strength (PSI) | 5502 | 5148 | 5074 | 5852 | 5973 | 6310 |
| % Compression | 17.9 | 12.8 | 16.0 | 9.2 | 11.9 | 16 |
| % Recovery | 66.3 | 62.9 | 61.7 | 77.9 | 78.2 | 78.3 |
| Water Absorption* | | | | | | |
| % Weight Change | 31.1 | 41.0 | 37.9 | 37.6 | 38.2 | 24.0 |
| % Thickness Change | 36.6 | 49.8 | 41.1 | 44.9 | 47.4 | 26.1 |
| % Moisture | — | — | — | 7.8 | 7.3 | 3.2 |
| After Curing | | | | | | |
| Tensile Strength (PSI) | 5152 | 5690 | 5607 | 6603 | 6713 | 5260 |
| % Compression | 12.0 | 11.7 | 11.7 | 8.2 | 8.5 | 15.4 |
| % Recovery | 84.6 | 84.3 | 80.8 | 85.0 | 87.6 | 84.5 |
| Water Absorption* | | | | | | |
| % Weight Change | 27.8 | 28.2 | 25.0 | 19.9 | 22.2 | 20.6 |
| % Thickness Change | 29.7 | 27.0 | 24.9 | 15.2 | 18.7 | 17.4 |

*Immersion for 22 hours at room temperature

As the data in the two tables demonstrate, fiberboard shims containing isocyanate added in the blend chest generally performed better than any of the other tested shims. Shims produced from pulp wherein the isocyanate was added during refining exhibited test results better than those from shims containing no isocyanate or containing isocyanate infused by immersion, but not as good as those shims having isocyanate introduced at the blend chest.

It can be seen, then, that incorporation of a blocked isocyanate into a cellulosic fiber mixture prior to drying and shaping produces a fiberboard shim having properties generally as good as or better than fiberboard shims which have been dipped into a solvent-based isocyanate solution after drying and shaping. The incorporation of the blocked isocyanate additionally reduces the number of steps required to produce fiberboard shims, improves the distribution of isocyanate among the cellulosic fibers of the shim thereby enhancing the extent of cross-linking, and eliminates the need for potentially hazardous solvents in introducing isocyanate into the shim.

Having described this invention and its operating parameters, variations may be achieved without departing from the spirit and scope hereof.

What is claimed is:

1. A process for manufacturing hardened fiberboard shims comprising:
    combining cellulosic fiber, a blocked isocyanate and water soluble thermosetting resin said thermosetting resin having a cure temperature below a cure temperature of said blocked isocyanate to from a pulp furnish;
    forming a fiberboard from said furnish by forming an uncured sheet and heating said sheet to a temperature above the cure temperature of said thermosetting resin and less than the cure temperature of said blocked isocyanate thereby curing said thermosetting resin;
    cutting said fiberboard to form a shim; and
    curing said shim, thereby causing said blocked isocyanate to react with said cellulosic fiber.

2. The process of claim 1 wherein said thermosetting resin is a phenolic resin.

3. The process of claim 2 further wherein said cure temperature of said blocked isocyanate is from about 160° to about 200° C.

4. A process for manufacturing hardened fiberboard shims comprising:
    combining a blocked isocyanate, cellulosic pulp, a phenolic resin, a sizing agent, an acidic pH adjusting component, a basic pH-adjusting component, and a large excess of water to form a furnish;
    reducing the water content of said furnish and forming an uncured sheet;

heating said sheet to cure said phenolic resin thereby forming a fiberboard;
die cutting said fiberboard to form a shim; and
curing said shim by the application of heat to cause said blocked isocyanate to react with said cellulosic pulp.

5. The process of claim 4 wherein said shim is cured at about 195° C.

6. A composition for manufacturing shims for use in assembling automotive components comprising:
a cellulosic fiberboard pulp,
a blocked isocyanate having a first cure temperature,
a water soluble reaction mixture having a second cure temperature which is lower than the first cure temperature.

* * * * *